United States Patent
Tondu et al.

(10) Patent No.: US 12,030,298 B2
(45) Date of Patent: Jul. 9, 2024

(54) LAMINATED GLAZING COMPRISING A PERIPHERAL STEPPED ELEMENT MADE OF POLYMER MATERIAL HAVING A REQUIRED MAXIMUM PERMEABILITY TO WATER VAPOR

(71) Applicant: SAINT-GOBAIN GLASS FRANCE, Courbevoie (FR)

(72) Inventors: Thomas Tondu, Saint-Martin d'Abbat (FR); Didier Tellier, Saint-Pere sur Loire (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 433 days.

(21) Appl. No.: 17/296,409

(22) PCT Filed: Dec. 3, 2019

(86) PCT No.: PCT/FR2019/052906
§ 371 (c)(1),
(2) Date: May 24, 2021

(87) PCT Pub. No.: WO2020/115425
PCT Pub. Date: Jun. 11, 2020

(65) Prior Publication Data
US 2022/0024186 A1    Jan. 27, 2022

(30) Foreign Application Priority Data
Dec. 4, 2018 (FR) .................................... 1872291

(51) Int. Cl.
*B32B 15/04*    (2006.01)
*B32B 3/02*    (2006.01)
(Continued)

(52) U.S. Cl.
CPC .............. *B32B 7/12* (2013.01); *B32B 3/02* (2013.01); *B32B 17/10* (2013.01);
(Continued)

(58) Field of Classification Search
CPC ................. B32B 17/10036; B32B 17/10045
(Continued)

(56) References Cited

U.S. PATENT DOCUMENTS 2,750,312 A * 6/1956 Bloom, Jr. ............... E06B 7/28
428/38
3,414,445 A * 12/1968 Orcutt ............... B32B 17/10908
428/38
(Continued)

FOREIGN PATENT DOCUMENTS

| EP | 0 693 366 A1 | 1/1996 |
| FR | 2 909 921 A1 | 6/2008 |
| WO | WO 2004/011249 A1 | 2/2004 |

OTHER PUBLICATIONS

The Effect of Fiber Orientation on the Toughening of Short Fiber Reinforced Polymers, Norman, 2003.*
(Continued)

*Primary Examiner* — Lauren R Colgan
(74) *Attorney, Agent, or Firm* — Pillsbury Winthrop Shaw Pittman LLP

(57) ABSTRACT

Laminated glazing includes a first glass sheet constituting an external face of the glazing, connected to a second glass sheet by a first interlayer adhesive layer, the edge of the first glass sheet being set back with respect to that of the second, a peripheral part of the free surface of the first glass sheet, its edge face, that of the first interlayer adhesive layer and a part of the surface of the second glass sheet extending beyond the first describing a continuous stepped contour which is covered, with interposition of adhesive, with a
(Continued)

Figure 1:
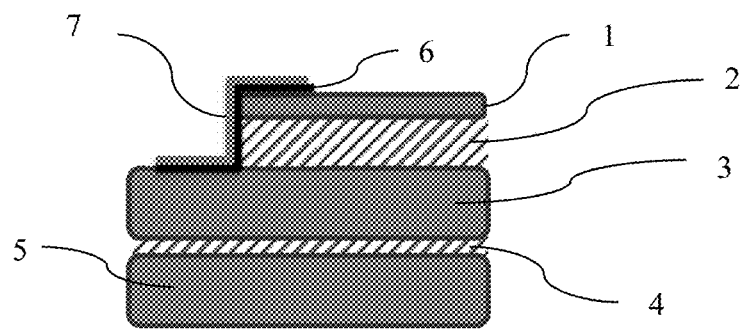

stepped element made of polymer material which can contain reinforcing fillers, which exhibits a permeability to water vapor at most equal to 5 g/m²/day.

18 Claims, 2 Drawing Sheets

(51) Int. Cl.
    *B32B 7/12*      (2006.01)
    *B32B 17/06*      (2006.01)
    *B32B 17/10*      (2006.01)

(52) U.S. Cl.
    CPC .. *B32B 17/10036* (2013.01); *B32B 17/10045* (2013.01); *B32B 17/10302* (2013.01); *B32B 17/10614* (2013.01); *B32B 17/10761* (2013.01); *B32B 17/1077* (2013.01); *B32B 17/10788* (2013.01); *B32B 17/10807* (2013.01); *B32B 2307/7246* (2013.01); *B32B 2605/006* (2013.01); *B32B 2605/18* (2013.01)

(58) Field of Classification Search
    USPC ......................................................... 428/428
    See application file for complete search history.

(56) References Cited

U.S. PATENT DOCUMENTS

| | | | | |
|---|---|---|---|---|
| 3,424,642 | A * | 1/1969 | Orcutt | B32B 17/10366 156/107 |
| 3,549,466 | A * | 12/1970 | Bradley | B32B 17/10293 156/107 |
| 3,616,122 | A * | 10/1971 | Orcutt | B32B 17/10779 156/107 |
| 3,632,841 | A * | 1/1972 | Fortin | B29C 67/00 264/2.7 |
| 3,855,055 | A * | 12/1974 | Kanno | C08K 5/098 428/437 |
| 4,004,388 | A * | 1/1977 | Stefanik | B32B 17/10853 52/204.593 |
| 4,046,951 | A * | 9/1977 | Stefanik | B32B 3/02 428/447 |
| 4,377,611 | A * | 3/1983 | Fischer | C08J 7/0427 427/164 |
| 4,551,372 | A * | 11/1985 | Kunert | B32B 17/10302 428/81 |
| 4,817,347 | A * | 4/1989 | Hand | B32B 17/10293 219/203 |
| 4,933,227 | A * | 6/1990 | Stewart | B64C 1/1492 52/204.593 |
| 5,637,363 | A * | 6/1997 | Leray | B32B 17/10036 156/107 |
| 5,885,714 | A * | 3/1999 | Demeester | B32B 27/306 428/416 |
| 5,908,675 | A * | 6/1999 | Marquardt | B32B 17/10155 428/209 |
| 6,034,353 | A * | 3/2000 | Demeester | B32B 17/10045 52/171.2 |
| 6,818,281 | B2 * | 11/2004 | Blevins | B64C 1/1492 428/192 |
| 7,118,070 | B2 * | 10/2006 | Abrams | B64C 1/1492 244/131 |
| 10,286,630 | B2 * | 5/2019 | Boek | B32B 3/08 |
| 2003/0079772 | A1 * | 5/2003 | Gittings | H01L 31/0488 136/251 |
| 2007/0059541 | A1 * | 3/2007 | Yoshida | C08J 7/043 428/483 |
| 2008/0193686 | A1 * | 8/2008 | Loergen | B32B 17/10339 428/34 |
| 2009/0159117 | A1 * | 6/2009 | Ferri | B32B 17/10788 156/278 |
| 2010/0020381 | A1 * | 1/2010 | Legois | B32B 17/1077 359/275 |
| 2012/0219749 | A1 * | 8/2012 | Leighton | C04B 35/63424 428/68 |
| 2013/0026296 | A1 * | 1/2013 | Yokoi | B32B 17/1077 244/129.3 |
| 2015/0239215 | A1 * | 8/2015 | Offermann | B32B 17/1055 428/215 |
| 2018/0207911 | A1 * | 7/2018 | Lampman | B32B 17/10834 |

OTHER PUBLICATIONS

International Search Report as issued in International Patent Application No. PCT/FR2019/052906, dated Mar. 2, 2020.

* cited by examiner

LAMINATED GLAZING COMPRISING A PERIPHERAL STEPPED ELEMENT MADE OF POLYMER MATERIAL HAVING A REQUIRED MAXIMUM PERMEABILITY TO WATER VAPOR

CROSS-REFERENCE TO RELATED APPLICATIONS

This application is the U.S. National Stage of PCT/FR2019/052906, filed Dec. 3, 2019, which in turn claims priority to French patent application number 1872291 filed Dec. 4, 2018. The content of these applications are incorporated herein by reference in their entireties.

Heated aeronautical windshields are laminates of at least three sheets (or plies) of inorganic and/or organic glasses, the outermost of which can act as support for the heating (deicing) function. These sheets are adhesively bonded two by two via interlayer adhesive layers, such as polyvinyl butyral (PVB), thermoplastic polyurethane (TPU), ethylene/vinyl acetate (EVA), ionomer, and the like. Moisture can penetrate the interlayer adhesive layers, in particular that between the external heating ply and its neighboring ply, and cause failures by different mechanisms:
  delaminations;
  corrosion, oxidation of the electrical connection elements;
  electrolysis of the heating layers, such as indium oxide doped with tin (Indium Tin Oxide—ITO) (inducing a cracking of the layers which can be the cause of an electric arc in the vicinity of the layers);
  interlayer bleaching, opacification;
  peripheral coloring by migration of tinting element of adhesive/seal (for example made of polysulfide) into the interlayer.

Furthermore, as the external ply is not naturally held by the system for bonding to the aircraft (which maintains the two structural plies), due to the deformations of the glazing subjected to the pressure of the aircraft, mechanisms of tearing-off and/or peripheral shearing of the external ply can take place, which promotes delamination phenomena.

Moisture penetration can be managed by different strategies:
  peripheral application of a few mm of a leaktightness element: typically of two-component polysulfide or polyurethane (PU) type;
  application of an adhesively bonded stepped (or Z-shaped -"zed") metal (stainless steel, aluminum) peripheral element, conforming to a peripheral zone of the laminated glazing, as will be seen subsequently; this zed is adhesively bonded to the glass sheets of the laminated glazing and can be covered by an air- and watertight seal, such as made of silicone or equivalent, as well as by a "bead" (external seal made of polysulfide or equivalent) providing aerodynamic continuity between glazing and aircraft structure and good inertia to aeronautical fluids (cleaning products, glycol (ground deicing), and the like); moreover, the bead also makes it possible to significantly limit the problems related to arcs and sparks, in particular electric arc capturing and surface discharges.

The application of a leaktightness element presents many difficulties. This is because the implementation is extremely problematic as it is necessary to install an interlayer-free zone during the lamination, which results in great risks of optical defect (keeping the faces of the laminate parallel). Furthermore, the products used for producing leaktightness are poor barriers to moisture, which renders this solution rather ineffective (constraints related to the process of application by injection, in particular).

In contrast, the application of stepped peripheral barrier elements, referred to as "zeds", made of stainless steel (or sometimes aluminum), has greatly reduced the penetrations of moisture and has thus made it possible to eliminate, to a very great extent, the modes of failure cited above.

On the other hand, the application of the metal zed has caused new problems:
  increased risk of electrical insulation defect with regard to elements of the heating systems; it is specified that, in order to supply the heating layers, cables run at the level of the zed between the external ply and the interior face of the glazing;
  electrical discharges between zed and aircraft structure causing noise, light and/or electromagnetic disturbance, or element of the connection of the glazing (failure);
  facilitating initiations of surface discharges which dazzle the pilots;
  point of attraction for lightning (projecting and electrically conducting metal nature of the zeds);
  weakening of the silicone seal at its end;
  costs of tooling equipment for shaping, such as by stamping, which are prohibitive for short runs;
  complex management of zed-glazing shape tolerances;
  geometry of the zeds, which confers good stiffness on them and makes the manufacturing process complex;
  metal nature of the zed, which prompts if not necessitates covering it with a "bead" typically made of polysulfide which results in a need for maintenance because this bead tends to become eroded.

The inventors have thus sought to replace the metal zed with a zed made of polymer material which can be shaped, for example, by a thermoforming process. The polymer material has been chosen in order to exhibit sufficient properties of permeability to water vapor to prevent degradation of the glazings.

Specific permeability P is understood to mean the rate of permeation of 1 mm of material. The flows are then expressed in $g/m^2/day \cdot mm$ and express the intrinsic barrier to water vapor performance of a material.

The barrier to water vapor performance of a given material or of a given combination of materials (of given thickness) is its permeability p expressed in $g/m^2/day$.

For a homogeneous material with a thickness t, the relationship $p=P/t$ exists.

The inventors have been able to guarantee the leaktightness to water vapor provided by the peripheral stepped metal elements ("zeds") while overcoming the problems linked to their electrically conducting character and to their manufacturing processes. To this end, a subject matter of the invention is a laminated glazing comprising at least a first glass sheet constituting an external face of the glazing, connected to a second glass sheet by a first interlayer adhesive layer, in which the edge of the first glass sheet is set back with respect to that of the second, a peripheral part of the free surface of the first glass sheet, the edge face of the latter, the edge face of the first interlayer adhesive layer and a part of the surface of the second glass sheet extending beyond the first glass sheet describing a continuous stepped contour which is covered with a stepped element with interposition of adhesive, characterized in that the stepped element is made of polymer material which can contain reinforcing fillers and exhibits a permeability to water vapor at most equal to 5 and preferably 1 $g/m^2/day$.

Glass is understood here to mean both an inorganic glass, such as soda-lime, aluminosilicate, and the like, glass, and an organic glass consisting of a transparent structural polymer material, of which poly(methyl methacrylate) (PMMA) and polycarbonate (PC) are common examples.

In practice, the stepped metal elements do not give rise to any permeation of water vapor through their thickness but a bypass path via the adhesive (polysulfide) exists. Due to the greater flexibility of the stepped elements made of polymer material, it is possible to reduce the thickness of adhesive and to make these stepped elements equivalent in terms of permeability to water vapor to the adhesively bonded stepped metal elements.

All the abovementioned electrical problems of the stepped metal elements are eliminated. Polymer materials are good electrical insulators.

Moreover,
- the methods for processing polymer materials, such as thermoforming, are substantially less expensive than the stamping of metals;
- polymer materials are not subject to corrosion;
- polymer materials exhibit a flexibility making the sensitivity of the relative shapes of the stepped element and of the laminated glazing more easily manageable in production and limit the adhesive bonding stresses which can cause detachments of the stepped element in service.

Said adhesive comprises, for example, a polysulfide and/or a polyurethane.

The stepped element is integral, of a single part, or optionally it is in several parts.

According to preferred characteristics of the laminated glazing of the invention:
- the stepped element exhibits an elastic modulus at most equal to 5 GPa; it should be emphasized that this excludes polymers (such as thermosetting resins of the epoxy or unsaturated polyester type) reinforced by reinforcing fibers (FRP for fiber-reinforced polymer), which denotes a reinforcement by relatively long fibers (such as glass or carbon fibers) which are optionally woven;
- said polymer material is chosen from polyolefins (including polyethylene (PE), polypropylene (PP) or polyisobutylene (P-IB)), polyvinyl chloride and its derivatives (for example poly(vinyl dichloride) (PVDC)), styrene polymer (for example polystyrene (PS), acrylonitrile/styrene/butadiene (ABS), styrene/acrylonitrile (SAN)), polyacrylic (including polyacrylonitrile (PAN) and poly(methyl methacrylate) (PMMA)), polyester (including poly(ethylene terephthalate) (PET) and poly(butylene terephthalate) (PBT)), polyoxymethylene (POM), polyamide (PA), fluorinated polymer, such as polychlorotrifluoroethylene (PCTFE), polycarbonate (PC), aromatic polysulfone, including polysulfone (PSU), polyphenylene ether (PPE), polyurethane and polyurea (PU), epoxy (EP), alone or as a mixture and/or copolymer of several of them;
- the stepped element is composed of several layers of identical or different polymer materials, which can be obtained by coextrusion, for example;
- said polymer material contains short-fiber and/or oriented lamellar reinforcing fillers; these fillers are such as to promote a sufficiently low permeability to water vapor; mention may be made of short glass or carbon fibers;
- the stepped element has a thickness at most equal to 800 μm, preferably 300 μm;
- said polymer material exhibits at least one surface treatment providing:
    - a better barrier to water vapor performance: dense oxide(s) deposited by chemical vapor deposition CVD, such as $SiO_2$ or $Al_2O_3$;
    - an adhesion property;
- said adhesive has a thickness at most equal to 350 μm, preferably 200 μm;
- the stepped element is covered with an air- and watertight seal which protects against solar radiation and fluids; this seal is advantageously made of silicone or equivalent;
- the stepped element is covered with a bead which provides the laminated glazing with aerodynamic continuity between glazing and mounting structure, such as aircraft structure, and good inertia to treatment fluids, such as aeronautical fluids, cleaning products, degreaser, glycol for ground deicing and the like; this bead can be made of polysulfide or equivalent;
- the laminated glazing comprises at least a third glass sheet connected to the second glass sheet by a second interlayer adhesive layer; in this configuration in particular, the stepped element can extend beyond said continuous stepped contour defined above, so as to cover the entire thickness of the laminated glazing, including the edge faces of the second glass sheet, of the second interlayer adhesive layer and of the third glass sheet;
- the first glass sheet is made of inorganic glass with a thickness of between 0.5 and 5 mm, preferably between 2 and 4 mm, or made of a polymer material, such as poly(methyl methacrylate) (PMMA), with a thickness of between 0.5 and 5 mm;
- the second glass sheet and, if appropriate, the third glass sheet, indeed even the following sheets, are made of inorganic glass with a thickness of between 4 and 10 mm or of a polymer material, such as poly(methyl methacrylate) (PMMA), with a thickness of between 5 and 30 mm, preferably at most 20 mm;
- said interlayer adhesive layers are made of polyurethane (PU), polyvinyl butyral (PVB), ethylene/vinyl acetate (EVA) or equivalent, the thickness of the first interlayer adhesive layer is of between 3 and 10 mm, preferably 4 and 8 mm, and the thickness of the second interlayer adhesive layer and, if appropriate, of the following layers is of between 0.5 and 4 mm, preferably at most equal to 2 mm.

Another subject matter of the invention consists of a process for the manufacture of the laminated glazing described above, characterized in that the stepped element is manufactured separately from its mounting structure by thermoforming, injection, injection molding and RIM (reaction injection molding) reaction, extrusion or coextrusion, blowing or compression/transfer. Conversely, it should be specified that the composite stepped elements (resin reinforced with glass fiber) formed directly on the laminated glazing are designed for good evacuation of the gases during the stage of curing the resins (crosslinking in autoclave or vacuum bag). This good ability to drain gases conflicts with good performance qualities of barrier to moisture (porosity effect). The stepped element is manufactured, by the process of the invention, in a single or in several parts.

Another subject matter of the invention consists of the application of the laminated glazing described above as building glazing or land, air or water vehicle glazing, or for street furniture, especially as aircraft cockpit glazing.

Figure 2:
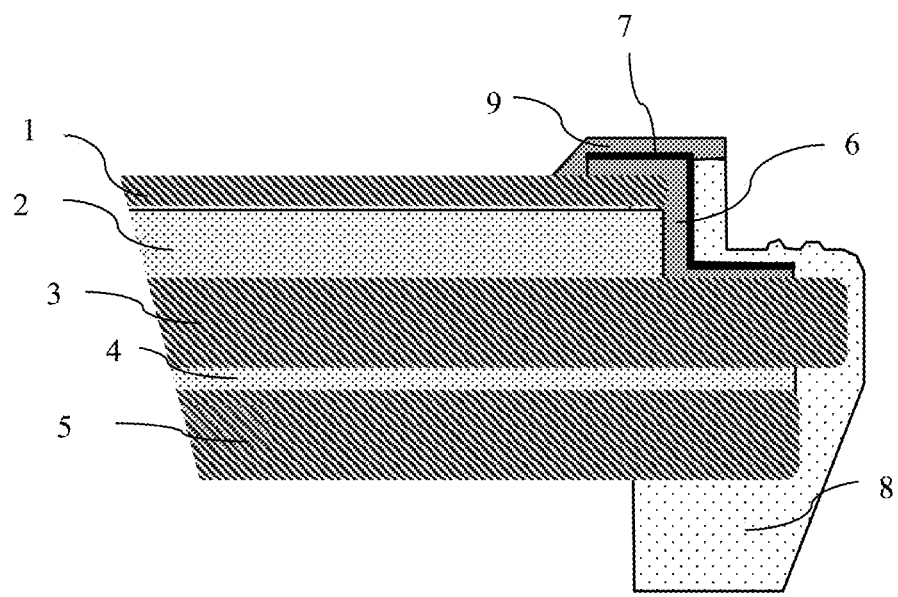
Figure 3:
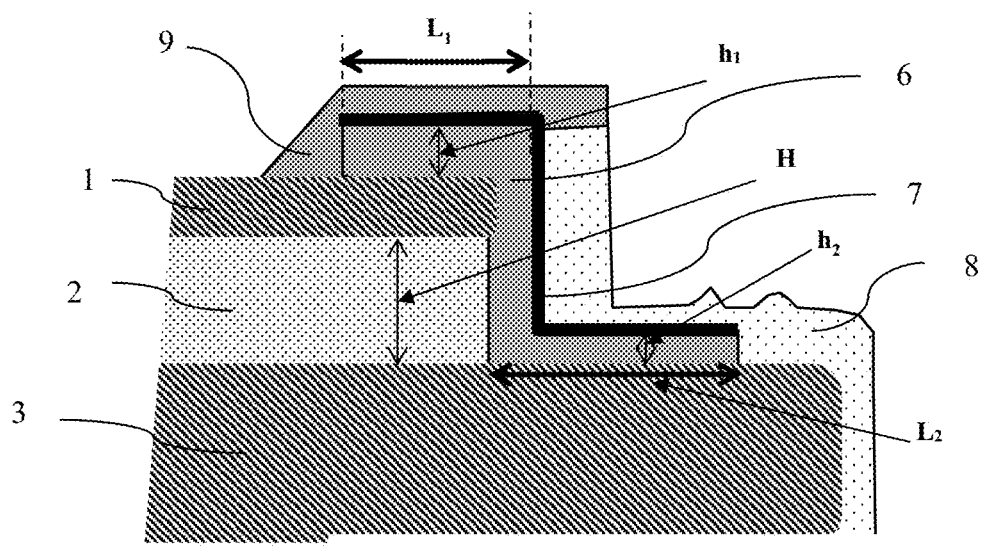

A better understanding of the invention will be obtained in the light of the following examples, with reference to the appended drawings, in which:

FIG. 1 diagrammatically represents, in section, a first embodiment of the laminated glazing of the invention;

FIG. 2 diagrammatically represents, in section, a second embodiment of the laminated glazing of the invention;

FIG. 3 is a partial diagrammatic view of a laminated glazing according to the invention in support of the specific explanations relating to the permeability to water vapor of the stepped element ("zed") made of polymer material.

In these examples, a glass sheet denotes a chemically tempered aluminosilicate glass sheet, sold by Saint-Gobain Sully under the Solidion® registered brand name.

With reference to FIGS. 1 and 2, a laminated glazing comprises a first glass sheet 1 constituting an exterior face of the glazing, having a thickness of 3 mm, adhesively bonded to a second glass sheet 3 having a thickness of 8 mm by a first interlayer adhesive layer 2 of polyvinyl butyral (PVB) with a thickness of 5.3 mm.

A third glass sheet 5 with a thickness of 8 mm is adhesively bonded to the second 3 by a second interlayer adhesive layer 4 of polyvinyl butyral (PVB) with a thickness of 2 mm.

The edge of the first glass sheet 1 is set back with respect to that of the second 3, a peripheral part of the free surface of the first glass sheet 1, the edge face of the latter 1, the edge face of the first interlayer adhesive layer 2 and a part of the surface of the second glass sheet 3 extending beyond the first glass sheet 1 describing a continuous stepped contour which is covered with a stepped element 7 made of polyethylene terephthalate (PET) with a thickness of 355 μm.

Said continuous stepped contour is covered with the stepped element 7 with the interposition of a thickness of 100 μm of adhesive 6 made of polysulfide.

In FIG. 2, the stepped element 7 is covered with an air- and watertight seal 8, made of silicone, and with a bead 9 made of polysulfide which gives the laminated glazing an aerodynamic continuity between glazing and mounting structure, such as aircraft structure, and good inertia to the treatment fluids, as already explained.

With reference to FIGS. 1 and 2, the stepped element 7 can be more extended than represented, so as to cover, for example, the entire peripheral edge of the laminated glazing, in particular also the edge faces of the second glass sheet 3, of the second interlayer adhesive layer 4 and of the third glass sheet 5.

With reference to FIG. 3, relative to the stepped element 7 made of PET adhesively bonded to the edge face of the laminated glazing, three moisture (water vapor) flows are to be considered:

flow making its way through the adhesive between the stepped element 7 and the first glass sheet 1, with a thickness h1;

flow making its way through the adhesive between the stepped element 7 and the second glass sheet 3, with a thickness h2;

flow making its way through the stepped element 7 with a thickness $t_{zed}$.

These three flows diffuse into the first interlayer adhesive layer with a thickness H.

It is then possible to introduce the notion of equivalent barrier corresponding to an imaginary material precisely covering the interlayer thickness on the periphery of the glazing. The properties of permeation to water vapor of the equivalent barrier are then defined by:

$$p_{eq} \cdot H = P_1 \frac{h_1}{L_1} + P_2 \frac{h_2}{L_2} + P_{zed} \frac{H}{t_{zed}} \quad [\text{Math 1}]$$

$$p_{eq} = \frac{P_1}{H} \frac{h_1}{L_1} + \frac{P_2}{H} \frac{h_2}{L_2} + \frac{P_{zed}}{t_{zed}}$$

$$p_{eq} = p_1 + p_2 + p_{zed}$$

The values necessary for the calculation of $p_{eq}$, and the result, are recorded in the following tables, for four laminated glazing structures specified under each of the tables.

TABLE 1

| ° | 1 | 2 | zed | total |
|---|---|---|---|---|
| t or L [mm] | 11 | 18 | 0.5 | ° |
| h [mm] | 1 | 0.5 | ° | ° |
| P [g/m²/day · mm] | 50 | 50 | 0 | ° |
| p [g/m²/day] | 0.67 | 0.20 | 0.00 | 0.87 |

Case of an AIRBUS A320 (H = 6.8 mm) with metal Zed

TABLE 2

| ° | 1 | 2 | zed | total |
|---|---|---|---|---|
| t or L [mm] | 11 | 18 | 0.355 | ° |
| h [mm] | 0.1 | 0.1 | ° | ° |
| P [g/m²/day · mm] | 50 | 50 | 0.2 | ° |
| p [g/m²/day] | 0.07 | 0.04 | 0.56 | 0.67 |

Case of an AIRBUS A320 (H = 6.8 mm) with Zed made of PET

TABLE 3

| ° | 1 | 2 | zed | total |
|---|---|---|---|---|
| t or L [mm] | 12.2 | 17.8 | 0.5 | ° |
| h [mm] | 1 | 0.5 | ° | ° |
| P [g/m²/day · mm] | 40 | 40 | 0 | ° |
| p [g/m²/day] | 0.68 | 0.23 | 0.00 | 0.91 |

Case of an AIRBUS A350 (H = 4.8 mm) with metal Zed

TABLE 4

| ° | 1 | 2 | zed | total |
|---|---|---|---|---|
| t or L [mm] | 12.2 | 17.8 | 0.355 | ° |
| h [mm] | 0.1 | 0.1 | ° | ° |
| P [g/m²/day · mm] | 40 | 40 | 0.2 | ° |
| p [g/m²/day] | 0.07 | 0.05 | 0.56 | 0.68 |

Case of an AIRBUS A350 (H = 4.8 mm) with Zed made of PET

As is shown by the comparison of tables 1 and 2, on the one hand, and 3 and 4, on the other hand, the replacement of a stepped metal element 7 by a stepped element 7 made of PET is capable of giving a permeability p lowered from 0.87 to 0.67 g/m²/day, on the one hand, and from 0.91 to 0.68 g/m²/day, on the other hand.

This is because the deformable polymer material more easily matches the shape of the glazing without mounting constraints. Its use makes it possible to reduce the thicknesses of adhesive from 500 μm or 1 mm to 100 μm, hence the possibility of reducing the value of the permeability p with respect to the metal zed (stepped element) 7.

The nonmetal zed eliminates all the disadvantages related to the electrical conductivity of metals, as expected.

The manufacturing costs are lower for the polymer material, in particular by thermoforming, than for metals, especially as regards the tooling equipment.

The invention claimed is:

1. A laminated glazing comprising at least a first glass sheet constituting an external face of the laminated glazing, connected to a second glass sheet by a first interlayer adhesive layer, in which an edge of the first glass sheet is set back with respect to an edge of the second glass sheet, a peripheral part of a free surface of the first glass sheet, an edge face of the first glass sheet, an edge face of the first interlayer adhesive layer and a part of a surface of the second glass sheet extending beyond the first glass sheet describing a continuous stepped contour which is covered with a stepped element with interposition of an adhesive such that the stepped element and said adhesive both cover at least in part said peripheral part of the free surface of the first glass sheet, said edge face of the first glass sheet, said edge face of the first interlayer adhesive layer and said part of a surface of the second glass sheet extending beyond the first glass sheet, wherein the stepped element is made of polymer material which optionally contains reinforcing fillers, wherein the stepped element has a thickness of at most 450 μm and the adhesive has a thickness of at most 200 μm, and wherein the stepped element exhibits a permeability to water vapor at most equal to 5 $g/m^2/day$.

2. The laminated glazing as claimed in claim 1, wherein the stepped element exhibits a permeability to water vapor at most equal to 1 $g/m^2/day$.

3. The laminated glazing as claimed in claim 1, wherein the stepped element exhibits an elastic modulus at most equal to 5 GPa.

4. The laminated glazing as claimed in claim 1, wherein said polymer material is chosen from polyolefins (including polyethylene (PE), polypropylene (PP) or polyisobutylene (P-IB)), polyvinyl chloride and its derivatives, styrene polymer, polyacrylic (including polyacrylonitrile (PAN) and poly(methyl methacrylate) (PMMA)), polyester (including poly(ethylene terephthalate) (PET) and poly(butylene terephthalate) (PBT)), polyoxymethylene (POM), polyamide (PA), fluorinated polymer, polycarbonate (PC), aromatic polysulfone, including polysulfone (PSU), polyphenylene ether (PPE), polyurethane and polyurea (PU), epoxy (EP), alone or as a mixture and/or copolymer of several of them.

5. The laminated glazing as claimed in claim 4, wherein the polymer material is chosen from polyolefins (including polyethylene (PE), polypropylene (PP) or polyisobutylene (P-IB)), polyvinyl chloride and its derivatives, styrene polymer, polyacrylic (including polyacrylonitrile (PAN) and poly(methyl methacrylate) (PMMA)), polyester (including poly(ethylene terephthalate) (PET) and poly(butylene terephthalate) (PBT)), polyoxymethylene (POM), polyamide (PA), polycarbonate (PC), aromatic polysulfone, including polysulfone (PSU), polyphenylene ether (PPE), and/or copolymer of several of them.

6. The laminated glazing as claimed in claim 1, wherein the stepped element is composed of several layers of identical or different polymer materials.

7. The laminated glazing as claimed in claim 1, wherein said polymer material contains glass or carbon fibers and/or oriented lamellar reinforcing fillers.

8. The laminated glazing as claimed in claim 1, wherein said polymer material exhibits at least one surface treatment providing:
 a barrier to water vapor performance, the barrier being made of an oxide deposited by chemical vapor deposition CVD, the oxide being $SiO_2$ or $Al_2O_3$; and/or
 an adhesion property.

9. The laminated glazing as claimed in claim 1, wherein the stepped element is covered with an air- and watertight seal which protects against solar radiation and fluids.

10. The laminated glazing as claimed in claim 1, wherein the stepped element is covered with a bead which provides the laminated glazing with aerodynamic continuity between glazing and a mounting structure and inertia to treatment fluids.

11. The laminated glazing as claimed in claim 1, further comprising at least a third glass sheet connected to the second glass sheet by a second interlayer adhesive layer.

12. The laminated glazing as claimed in claim 11, wherein the second glass sheet and, the third glass sheet are made of inorganic glass with a thickness of between 4 and 10 mm or of polymer material with a thickness of between 5 and 30 mm.

13. The laminated glazing as claimed in claim 11, wherein the first and second interlayer adhesive layers are made of polyurethane (PU), polyvinyl butyral (PVB), ethylene/vinyl acetate (EVA), wherein a thickness of the first interlayer adhesive layer is of between 3 and 10 mm, and wherein a thickness of the second interlayer adhesive layer is of between 0.5 and 4 mm.

14. The laminated glazing as claimed in claim 1, wherein the first glass sheet is made of inorganic glass with a thickness of between 0.5 and 5 mm or of polymer material with a thickness of between 0.5 and 5 mm.

15. The laminated glazing as claimed in claim 1, wherein the stepped element is a preformed element that is separately formed by thermoforming, injection, injection molding and RIM (reaction injection molding) reaction, extrusion or coextrusion, blowing or compression/transfer and is directly mounted to the laminated glazing by bonding.

16. A process for the manufacture of a laminated glazing as claimed in claim 1, comprising manufacturing the stepped element separately from its mounting structure by thermoforming, injection, injection molding and RIM (reaction injection molding) reaction, extrusion or coextrusion, blowing or compression/transfer.

17. A method comprising manufacturing a building glazing or a land, air or water vehicle glazing, or a street furniture with the laminated glazing as claimed in claim 1.

18. The method as claimed in claim 17, wherein the laminated glazing is an aircraft cockpit glazing.

* * * * *